May 24, 1966 W. L. BEERS 3,252,302
MAGNETIC TORQUE UNIVERSAL COUPLING
Filed May 4, 1964

INVENTOR.
WILLIAM LEE BEERS
BY
Sughrue, Rothwell, Mion & Zinn
ATTORNEYS

United States Patent Office 3,252,302
Patented May 24, 1966

3,252,302
MAGNETIC TORQUE UNIVERSAL COUPLING
William L. Beers, Albion, Mich., assignor to Corning Glass Works, Corning, N.Y., a corporation of New York
Filed May 4, 1964, Ser. No. 364,669
8 Claims. (Cl. 64—28)

This invention relates to a universal coupling for driving and driven members including magnetic attraction torque coupling providing a torque limiting feature.

In certain applications of shaft couplings it is highly desirable, and sometimes required, that the driving and driven members be allowed certain misalignment so that the coupling is universal while at the same time providing for slippage between the driving and driven member should the driven member become overloaded. It is the primary object of this invention to provide such a universal coupling having torque limiting features provided by a magnet drive arrangement.

It is also desirable in some applications of torque limiting drive couplings to be able to quickly remove the driven member. It is another object of this invention to provide a magnetic torque universal coupling construction which allows the driven member to be quickly and easily removed from its bearing support.

Other objects of the invention will be pointed out in the following description and claims and illustrated in the accompanying drawings, which disclose, by way of example, the principle of the invention and the best mode which has been contemplated of applying that principle.

In general, this invention provides a torque limiting universal coupling utilizing permanent magnets on the driving and driven members to accomplish the torque limiting feature and a centrally located spherical button cooperating with a mating hole or bore to allow for universal movement.

The invention is disclosed in the environment of a tapered roller for a turn of a roller conveyor for conveying glassware to a lehr. Objects carried by the conveyor might occasionally get stuck causing the driven member, which is the tapered roller, to stop and if there were no torque limiting feature something would have to break. If the roller conveyor were carrying glassware it is, of course, highly desirable that there be torque limiting features. Further, since the roller constituting a driven member of this invention is tapered and is mounted so that the top will be horizontal, there is a necessity for a universal movement between the driving and driven members which are generally coaxial. Also, if something were to jam or break necessitating removal of the driven member tapered roller the coupling arrangement combined with the mounting of the tapered roller's opposite end in a supporting bearing allow for a quick and easy removal of the roller for repair or replacement.

Figure 1:
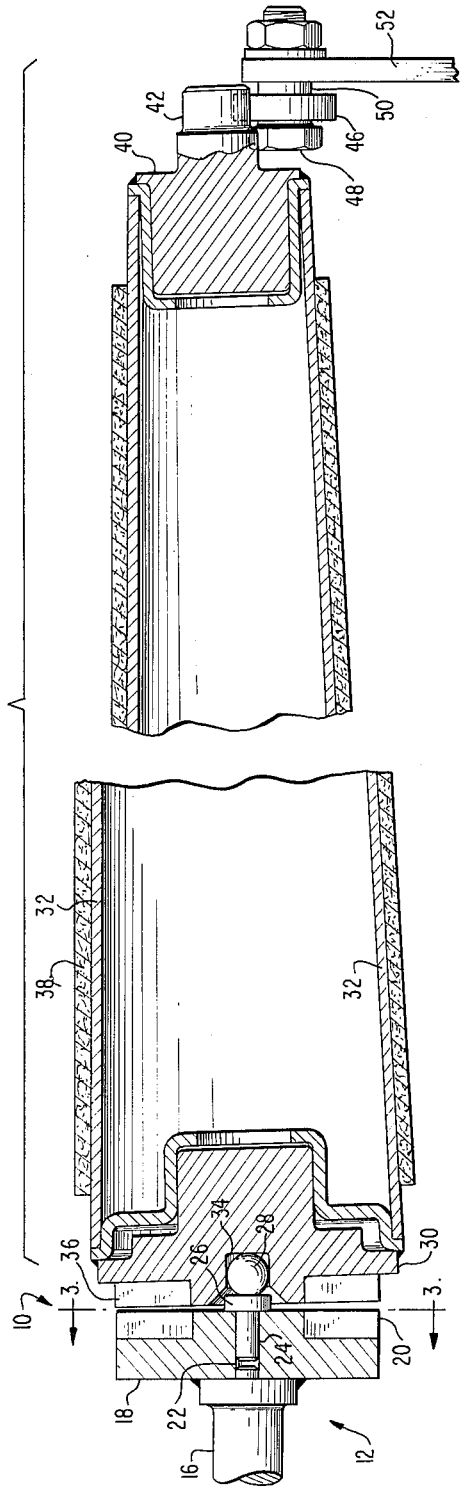
FIG. 1 is a sectional elevation view taken through the drive coupling and driven member of this invention.

Referring more specifically to the drawings, there is shown in FIG. 1 the coupling 10 constituting this invention. The coupling includes a drive member 12 and a driven member 14 which is generally coaxial but which are sufficiently misaligned to require universal movement in the coupling between the members.

Figure 2:
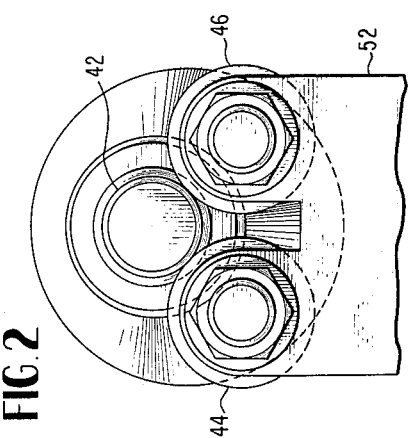
FIG. 2 is an end elevation view taken of the right end of the driven member as viewed in FIG. 1 and showing the support of an end of the driven member remote from the coupling to allow quick removal of the driven member.

The drive member 12 includes a drive shaft 16 to which is rigidly attached a face block 18 by welding or the like. Around the periphery in the end face of the face block 18 are permanent magnets 20 having north and south poles which may be in an annular array as shown in FIG. 2, or there may be a single magnet with north and south poles. The magnets 20 are rigidly attached to the face block 18 by mechanical or adhesive means.

The face block 18 has a central bore 22 into which a pin 24 is press fitted or welded to be rigid with the face block. Pin 24 is part of tooling button 26 and this tooling button also includes a spherical head 28 as a part thereof.

The driven member 14 includes a face block 30 rigidly attached to an elongated tapered roller 32 for example by tack welding. The face block 30 includes a blind bore 34 having a diameter and depth to support the spherical ball head of tooling button 26. Permanent magnets 36 identical to magnets 20 are secured to face block 30 in a manner similar to the way magnets 20 are secured to face block 18.

Figure 3:
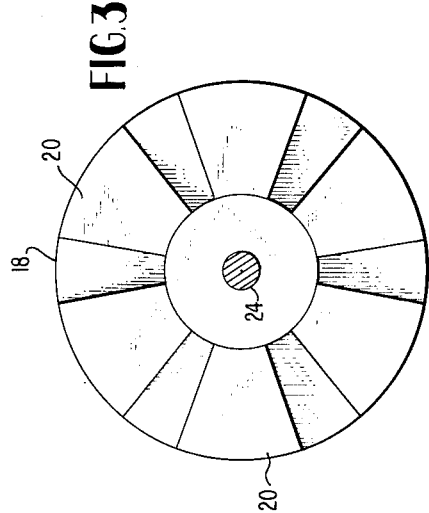
FIG. 3 is a sectional view taken along line 3—3 of FIG. 1 showing an end face of a magnetic coupling member.

The tapered roller 32 which may be used as a curved section or turn a roller conveyor for glassware being transported to or from a lehr, and therefore it may have an asbestos covering at 38 extending throughout most of its length. An end block 40 is attached to the small end of the roller 32. In the mounting shown, the top of the roller covering 38 is horiztontal, although this is not a requisite for the application of the principle of this invention. The end block 40 has an extending journal surface 42 which is supported on a support comprising a pair of antifriction bearings 44 and 46 positioned below the center of the journal surface 42 as shown in FIG. 3. Each of the antifriction bearing supports such as antifriction bearing 46 shown in FIG. 1 is carried by a bolt 48 and spaced upon a stationary frame 52 by a spacer 50.

The arrangement is such that the magnets 20 and 36 are attracted to one another, the north pole of one to a south pole of another, and this physical attraction of the magnets keeps the driven member 14 in place. Spherical ball 28 within bore 34 serves to hold a predetermined nominal spacing between the faces of magnets 20 and 36 so that they do not come in actual physical contact to create additional friction and wear. The spherical button 28 also carries the weight of the driven roller member 14 and, together with the support for the journal 42 as shown in FIG. 3 permits the lifting of the opposite end of the roller for removal and replacing.

In operation, the drive shaft 16 is rotated, rotating the face block 18 and attached permanent magnet 20. The magnetic attraction of magnet 20 to identical magnet 36 tends to pull magnet 36, attached face block 30, and tapered roller 32 along so long as the load on the driven member 14 is below a certain amount, i.e. up to a predetermined torque. Because of the spherical projecting button 28 cooperating with the bore 34 the driven member 32 is allowed universal movement during the rotation thereof.

When the arrangement is used for a roller conveyor and articles being conveyed get stuck and prevent rotation of tapered roller 32, then the drive will slip due to the load on roller 32 being greater than the amount of torque that the permanent magnets 20 and 36 can overcome. Moreover, if the roller 32 or its covering 38 is damaged or in need of repair it can be quickly and easily removed by lifting up on the small end of the roller, lifting journal 42 off of its support bearings 44 and 46 and then the other end of the driven member 14 will be removed without any interference of the permanently attached parts.

As can be seen applicant has disclosed a unique arrangement of a universal coupling in which the torque is transmitted from one coupling member to the other by permanent magnet means thus providing a low friction torque limiting device and allowing for easy disassembly of the coupling.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, the magnets themselves could actually touch, although this is not the preferred embodiment and the magnets could be tapered from the center outwardly to allow for further misalignment or actual physical contact. It is the intention, therefore, to be limited only as indicated by the scope of the following claims.

What is claimed is:

1. A magnetic torque and universal coupling comprising: a pair of generally coaxial but universally misalignable members, one adapted to drive and the other to be driven, a projecting surface portion on one of said members and a cooperating surface portion on the other of said shafts, the projecting surface and cooperating surface being so shaped to allow universal relative angular movement between the members, and permanent magnet means having separate magnetic poles carried by each of said members on the end faces thereof adjacent one another so that the attractive force of the permanent magnet means holds the members in constant angular relationship until a predetermined torque is reached.

2. A coupling as defined in claim 1 wherein mounting means for the members and the cooperating surface portions prevent physical contact of the permanent magnets.

3. A coupling as defined in claim 2 wherein the driven member is a tapered roller having its non-driven end rotatably journaled from beneath only so that the entire roller may be quickly and easily removed.

4. A coupling as defined in claim 2 wherein the projecting portion is a spherical headed tooling button attached to the driving member centrally thereof and the cooperating surface portion is a bored blind hole centrally of the driven member.

5. A coupling as defined in claim 2 further comprising a journal protruding from an end of the driven member opposite the coupling end and bearing means rotatably supporting the journal from below its center to thereby allow easy removal of the driven member.

6. A magnetic torque and universal coupling comprising: a pair of generally coaxial but universally misalignable shafts, one adapted to drive and the other to be driven, a projecting surface portion carried centrally on the end of one of said shafts and a cooperating surface portion carried centrally on the end of the other of said shafts, the projecting surface and cooperating surface being the only two portions of said shafts in physical contact and being so shaped to allow universal relative angular movement of the shafts, and permanent magnet means carried by said shafts on the end faces thereof to be adjacent but generally spaced from the end face of the other shaft such that the attractive force of the permanent magnet means holds the projecting surface and cooperating surface together and the shafts in constant angular relationship until a predetermined torque provided by the permanent magnet means is reached and exceeded.

7. A universal coupling including torque limiting features provided by a cooperating permanent magnetic attraction force type drive, the coupling comprising; a driving member including a drive shaft having an end face with a permanent magnet means rigidly attached thereto, a spherical ball member protruding axially from the end of the driving member, a driven member including an end face with a permanent magnet means rigidly attached thereto adjacent the permanent magnet on the end face of the driving member, means defining a depression for cooperating with the protruding spherical ball axially and centrally within the driven member, the amount of protrusion of the spherical ball from the end face of the driving member and the depth of the cooperating depression in the driven member cooperating to prevent the permanent magnets on the driving and driven member from coming into actual contact with one another, the end of the driven member opposite the magnet attached end face including a protruding journal, and bearing means supporting said journal from below the center of the journal only so that the driven member may be quickly and easily removed by lifting the end thereof having the journal.

8. A coupling as defined in claim 7 wherein the permanent magnet means includes an annular array of separate segmental permanent magnets.

References Cited by the Examiner

UNITED STATES PATENTS

| 2,147,204 | 2/1939 | Laird | 64—30 |
| 2,437,871 | 3/1948 | Wood | 192—84 X |
| 2,771,171 | 11/1959 | Schultz | 192—84 |
| 2,885,873 | 5/1959 | Beeston | 64—28 |

BROUGHTON G. DURHAM, *Primary Examiner.*

HALL C. COE, *Assistant Examiner.*